United States Patent Office 3,366,788
Patented Jan. 30, 1968

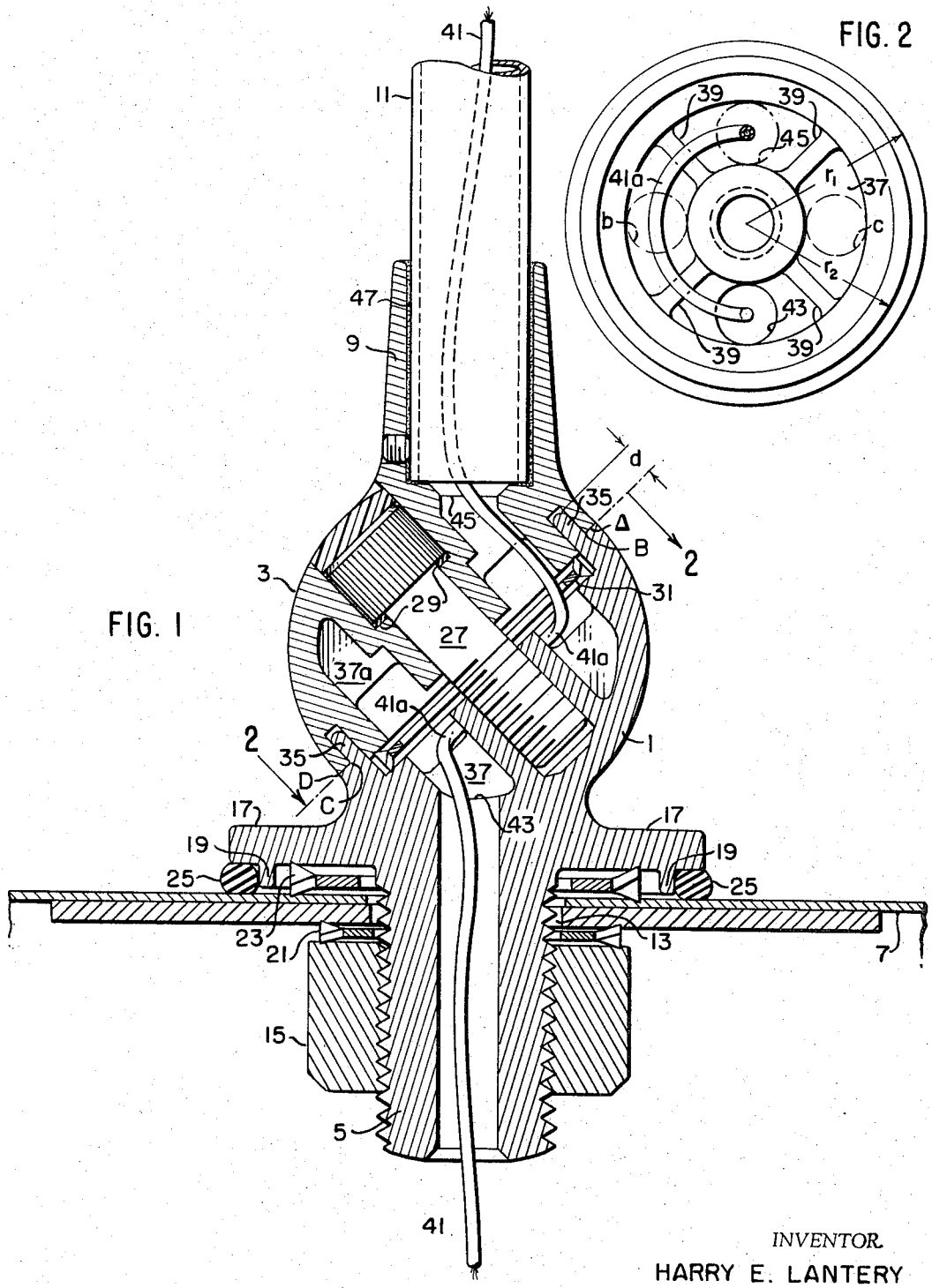

3,366,788
SEAL SWIVEL JOINT FOR VEHICLE
WARNING LIGHT
Harry E. Lantery, Wollaston, Mass., assignor to
Imagineers, Inc., Wollaston, Mass., a corporation
of Massachusetts
Filed July 30, 1965, Ser. No. 475,987
3 Claims. (Cl. 240—52)

ABSTRACT OF THE DISCLOSURE

Swivel joint comprising mating hemispherical members carrying oppositely directed stubs directed to an angle to their common axis, and having concentric sealing configurations permitting relative rotary adjustment.

This invention deals with the support of a warning lamp on a vehicle. Its major objects are to provide wide latitude of selection of the part of the vehicle body from which a mast, carrying the lamp at its upper end, extends in upright position and to ensure against the percolation of rain water between relatively movable parts of the assembly and into the interior of the vehicle. It attains these objects by the provision of a leak-proof or weather-sealed swivel joint of novel construction. A subsidiary object is to provide, in the construction and arrangement of the swivel joint through which an electric cable by which the lamp is powered must pass, generous clearance for that part of the cable which is contained within the swivel joint so that it may shift its position, in the course of relative movements of one part of the joint with respect to the other, without twisting, bending or knotting.

In my co-pending application Ser. No. 331,754 filed Dec. 19, 1963, now Patent No. 3,287,549, I have described an extensible hollow mast, to be mounted by bolts on the body of an automobile, and carrying a lamp at its upper end. To absorb shocks it includes an elastic link comprising a coil spring. By virtue of a hexagonal plastic liner which extends from the rigid mounting bracket below, through the coil spring, to the rigid mast above, twisting of the upper part of the mast and consequent disorientation of the lamp are prevented despite twisting of the lower part of the mast which may take place when the spring is flexed. An electric cable passes from the interior of the automobile body, through the mast, to the lamp. Leakage is prevented by the construction of the lamp housing and snug fit of each part of the assembly with others.

With this construction, the axis of the entire mast from its mounting nut to the lamp, and absent flexure of the shock absorbing spring, is a straight line; and any angle which may be introduced, between the mast proper and the mounting base, to accommodate a slope of the automobile body at the point of mounting is fixed. Consequently, the locations on the automobile body at which the assembly can be mounted are limited. Indeed, because of the wide differences of shape that distinguish the automobile bodies of the various makers it is sometimes difficult to find a mounting location on the body from which the mast can extend vertically, at least without inconvenience to the driver.

These difficulties are overcome by resort to a swivel joint of two hemispherical members such that complementary rotations of the lower member relatively to the automobile body and of the upper mast-supporting member relatively to the lower one enable a mechanic to mount the new assembly on any desired part of the automobile body without regard to its slope and, at the same time, to erect the mast vertically. The lower member carries a hollow stub by which the swivel joint is mounted on the automobile body while the upper member carries another hollow stub which grasps the mast by its lower end. The shock-absorbing spring and the twist preventing liner of the co-pending application are included above the swivel joint. As before, the cable through which the lamp is powered passes through the mast and into the interior of the automobile body. Now, however, it also passes through the swivel joint. This poses two auxiliary problems: to prevent leakage of rain water or washing water into the joint and thence into the interior of the automobile, and to prevent injury to that part of the cable that is contained within the swivel joint by twisting, bending or knotting in the course of rotation of one of the hemispherical members relatively to the other.

In the assembly of the invention the first problem is solved by the provision, as an integral part of the lower hemispherical member, of a circular ring or collar which does double duty: first as a dowel to hold the two hemispherical members in proper alignment, and second as a dam to deflect any water which may find its way between the two members before it can reach the hollow interior of the swivel joint and so find its way through a lower mounting stub into the interior of the automobile. With the construction of the invention any water which may find its way between the juxtaposed surfaces of the two members and reach the circular collar is turned aside and caused to run out again harmlessly. The second problem is solved by the provision, inside of each of the two hemispherical members, of ample space for the accommodation of a length of the cable which may be contained within the swivel joint so that, when the two members of the joint are in one relative angular position this length of cable occupies nearly a full circle while, in the opposite angular position it occupies substantially less than a semicircle. As one of the members is rotated relatively to the other member the length of cable contained within the joint swings inward and outward without excessive bending, twisting or knotting.

The invention will be fully apprehended from the following detailed description of a preferred embodiment thereof taken in connection with the appended drawings in which:

FIG. 1 is cross-sectional view of the swivel joint of the assembly mounted on a horizontal surface; and FIG. 2 is a cross-sectional view of one constituent member of the joint as seen perpendicular to the plane 2—2 of FIG. 1.

Referring now to the drawings, the swivel joint of the invention comprises a lower hemispherical member 1 and an upper hemispherical member 3 of the like diameters. The lower member 1 carries a lower hollow stub extension 5 by which it is to be mounted on the body 7 of the automobile. The upper hemispherical member 3 carries an upper hollow stub extension 9 proportioned to grasp a lamp supporting mast 11 by its lower end. The lower stub extension 5 is of a diameter such as to pass readily though without excessive lateral movement through a hole 13 cut through the automobile body 7 for the purpose. In each case the axis of the stub lies at an angle of forty five degrees from the polar axis of the hemispherical member. The lower stub extension 5 is externally threaded and carries at its lower end a nut 15. Just above the lower stub extension 5 is a lateral flange 17 of diameter substantially in excess of the diameter of the hole 13 and this flange carries a depending collar 19 of diameter slightly less than the diameter of the flange 17 itself. With this construction the lower hemispherical member 1 is readily secured to the automobile body 7 and tightly fixed against rotation by turning up the nut 15 which compresses a lower lock washer 21 between the nut 15 and the interior face of the automobile body 7 and at the same time compresses an upper lock washer 23 between the exterior face of the automobile body 7 and the lower face of the lateral flange 17. A weather-proof gasket 25, for example, a ring of rubber or neoprene of circular cross-section sometimes termed an "O ring" snugly surrounds the depending collar 19. The diameter of the cross-section of this gasket 25 is substantially in excess of the depth of the depending collar 19 so that, as the nut 15 is turned up, the gasket 25 is deformed thus to provide a secure seal against entrance of water through the hole 13 and thence into the interior of the automobile.

The upper hemispherical member 3 is pierced along its axis by a hole through which a bolt 27 passes while the lower hemispherical member 1 is drilled and tapped to acept the bolt thread. Leakage into the upper hemispherical member 3 is prevented by a gasket 29 seated under the head of the bolt 27 while leakage into the lower hemispherical member 1 is prevented by virtue of the fact that the central hole does not pierce the lower member but terminates short of its outer wall.

This bolt 27, when tightened, securely holds the upper member 3 against rotation relatively the lower member 1 through the agency of friction between the equatorial surfaces of the two members. Advantageously, this friction is enhanced by the inclusion of a lock washer 31 between them.

The bolt 27 is not relied upon to hold the two hemispherical members 1, 3 in alignment. To the contrary, the lower hemispherical member 1 is provided with a concentric ring or collar 35, advantageously integral with the lower member 1 itself. This collar 35 is located fairly close to the outer wall of the lower member 1, though not so close as to result in excessive thinness, and hence, weakness, of the outer wall of the upper member 3. The upper member 3 is provided with a concentric channel of width slightly in excess of the width of the collar 35 and of depth slightly in excess of the depth of the collar 35 but otherwise so positioned as to mate neatly with the collar 35 when the two hemispherical members 1, 3 are brought together in the position shown in the figure.

For the sake of economy of material and weight, each of the two hemispherical members 1, 3 is provided with a wide, deep channel 37 and 37a extending from its equatorial face nearly to its exterior surface. To prevent the presence of this channel from weakening the central portions of the members and so permitting misalignment between them, the channels are advantageously crossed by ribs 39, better shown in FIG. 2.

A cable 41, by which the lamp at the top of the mast 11 is powered, passes from a power source in the interior of the vehicle through the inside of the lower stub 5 and through an aperture 43 by which the lower stub 5 communicates with the channel 37 in the lower hemispherical member 1. It then passes around the central portion of the lower hemispherical member 1 through an angle which may lie anywhere in the range from about 90° to about 270°, upward through an aperture 45 which interconnects the upper stub 9 with the channel 37a of the upper member 3 and thence upward through the interior of the mast 11 to the lamp which is mounted at its upper end.

With the swivel joint of this construction the lower stub 5, shown in FIG. 1 as being mounted on a horizontal surface, may in fact be mounted on a surface of any slope at all. If, without relative movement between the hemispherical members 1, 3, the lower stub 1 is mounted on the left hand side of a vehicle on a substantially vertical surface, then the flange 17 lies in a substantially vertical plane and the upper stub extends in a substantially horizontal direction to the left. However, by loosening the nut 15 and the bolt 27 and rotating both the upper member relatively to the lower member and the lower member relatively to the automobile body the upper stub 3 can be brought again into an upright position. This is by virtue of the fact that the equatorial planes of the two members lie at 45° from the axes of the stubs 5, 9.

Similarly, the lower stub 5 may be mounted on a vertical surface at the right hand side of the vehicle in which case, again, the flange 17 lies in a vertical plane and the upper stub 9, absent relative rotation of the members 1, 3, would extend horizontally, this time toward the right. Again, by loosening the nut 15 and the bolt 27 and rotating the upper member 3 with respect to the lower member 1 and the lower one with respect to the mounting hole 13, the mast 11 and the upper stub 9 can again be brought into a vertical attitude.

Thus the invention contemplates that the lower hemispherical member 1 may under some conditions be rotated in a clockwise direction relatively to the upper member 3 by as much as 90° and, under other conditions, may be rotated through the same angle in the opposite sense by as much as 90°. Under the one condition, and assuming that the upper stub 3 after such rotation is brought back to a vertical position, the aperture 45 by which the interior of the upper stub 9 communicates with the auxiliary channel 37a remains in the position shown in FIG. 2, while the aperture 43 by which the interior of the lower stub 5 communicates with the auxiliary channel 37 in the lower hemispherical member 1 is shifted, in one case in a clockwise direction through 90° and, in the other case, through a counterclockwise direction through 90°. These movements of the lower stub with respect to the upper one act to bring the lower aperture, under the one condition to the position shown in FIG. 2 at b and, under the other condition to the second position shown at c. In the first case the loop 41a of cable which extends from the upper aperture 45 to the lower one 43 is deflected toward the left in FIG. 2 and in the other case it is drawn toward the right in FIG. 2.

These movements of the contained portion 41a of the cable 41 are accommodated in the swivel joint of the invention by the provision of auxiliary channels 37, 37a of sufficient widths and by the provision of a sufficient space between the upper edges of the ribs 39 of the lower member 1 and the lower edges of the ribs of the upper member 3. With the proportions shown the space between juxtaposed ribs is thus of the order of three times the thickness of the cable 41, while the width of channels 37, 37a is of the order of five times the thickness of the cable 41. Thus the movements of the looped portion 41a of the cable contained within the swivel joint are readily accommodated with the construction of the invention.

It is important, in the case of any automobile accessory, that it be so constructed and so mounted on the vehicle as to insure against leaks into the interior of the automobile. Leakage of water between the outer surface of the mast and the inner surface of the upper stub is prevented by sealing the former into the latter with the aid of a waterproof adhesive material such as epoxy cement 47. If, as in the case of epoxy cement, the material selected has electrical insulating properties, the mast can be firmly connected electrically, as well as mechanically, to the stub by driving home a set screw 49 having a sharp point which pierces the adhesive material and makes firm and positive contact with the mast 11, which is normally of metal.

It is an important feature of the swivel joint of the invention that leaks into the cavity inside of the joint, and thence through the lower aperture 43 and into the interior of the automobile, which might otherwise take place by the percolation of water between the two opposed surfaces of the members 1, 3, is prevented without reliance on any adhesive or completely waterproof material. This is accomplished by the proportioning and location of the circular collar 35. It will be observed from FIG. 1 that the height d of the collar 35, measured from its base to its upper end, is approximately twice as great as the distance Δ separating its outer surface from the exterior surfaces of the two hemispherical members 1, 3. When, as is normally the case, the upper stub 9 extends in a vertical direction, the equatorial planes of the two members 1, 3 lie approximately at 45° to the axis of the upper member, and this relation is entirely independent of whether the lower stub 5 be mounted on a horizontal surface, on a left hand vertical surface of an automobile, on a right hand vertical surface, or on any portion of intermediate slope. Thus, any water, due either to rain or to washing, which may percolate between the two members 1, 3, along the interface Δ tends to collect at the low point B. This low point of the angle shown in the cross-section is, however, the high point of the base of the concentric collar 35 as a whole, its low-low point being on the other side of the two hemispherical members at C. Hence, water which accumulates at the low point B tends to run downward around both sides of the concentric ring 35 to drip out of the spherical joint at the point D without entering the auxiliary channel 37 and finding its way through the lower aperture 43 into the interior of the automobile. In case this flow should be somehow impeded the level of the water at the point B would tend to rise. It could not, however, rise to the upper edge of the concentric ring 35 for the reason that, before it reaches this level it will have reached the level of its point of entrance at the interface Δ. Thus, the circular collar 35 constitutes a dam above which no water, from whatever source, can rise to find its way into the interior of the swivel joint. In thus operating as a dam, the circular collar 39 does not cease to serve as a dowel for holding the constituent hemispherical members of which the joint is constituted in alignment.

Having thus described my invention, what I claim is:

1. In combination with a vehicle warning lamp, a leakproof swivel device for supporting a mast, carrying said lamp, in upright position above a randomly oriented surface of a vehicle which comprises upper and lower members of outwardly hemispherical shapes and of like radii, a circular collar of depth $d$ protruding from the equatorial face of the lower member, the equatorial face of the upper member being provided with a circular channel of depth in excess of $d$ positioned to mate with said collar, means for firmly holding said members in coaxial alignment with a selectable relative angular displacement, a first hollow stub extending in a downward direction from the lower member in a direction at substantially forty-five degrees from its axis, said stub terminating in a threaded portion of diameter proportioned to pass through a hole cut through the body of said vehicle, said stub carrying a flange of diameter greater than the diameter of said hole, a collar, concentric with said stub, depending from the lower face of said flange, for centering a gasket of circular section, said threaded portion and said flange together constituting means for fixing said lower member to a randomly sloped part of the vehicle body in an adjustable orientation, a second hollow stub extending in an upward direction from the second member in a direction at substantially forty-five degrees from its axis, the inside diameter of said second stub being proportioned to grasp a lamp-carrying mast by its lower end, the equatorial face of each of said hemispherical members being provided with an auxiliary circular channel, unconnected with said first named channel, the interior of the hollow stub of each member communicating by way of an aperture, through which an electric cable can be threaded, with the auxiliary channel of the same member, opposed faces of said channels being spaced apart by at least several times the thickness of the cable, thereby to permit rotation of one member relatively to the other member through an angle of one hundred eighty degrees without knotting of, damage to, or interference from a cable contained between said members and within said swivel joint, and means proportioned and positioned to deflect rain water that may find its way between said equatorial faces and so to prevent its leakage into the auxiliary channel of the lower member and thence through the lower aperture and the lower stub, into the interior of the vehicle.

2. In combination with a vehicle warning lamp, a leakproof swivel device for supporting a mast, carrying said lamp, in upright position above a randomly oriented surface of a vehicle which comprises upper and lower members of outwardly hemispherical shapes and of like radii, a circular collar of depth $d$ protruding from the equatorial face of the lower member, the equatorial face of the upper member being provided with a circular channel of depth in excess of $d$ positioned to mate with said collar, a weather-sealed bolt extending along the axes of both members and through central portions of their equatorial faces, for preventing separation of one member from the other member and permitting friction-loaded relative angular movement of said members about their axes, a first hollow stub extending in a downward direction from the lower member in a direction at substantially forty five degrees from its axis, said stub carrying means by which it may be fixedly attached to a randomly sloped surface of said vehicle and in any angular orientation relatively thereto, a second hollow stub extending in an upward direction from the second member in a direction at substantially forty-five degrees from its axis, the inside diameter of said second stub being proportioned to grasp a lamp-carrying mast by its lower end, the equatorial face of each of said hemispherical members being provided with an auxiliary circular channel, unconnected with said first named channel, the interior of the hollow stub of each member communicating by way of an aperture, through which an electric cable can be threaded, with the auxiliary channel of the same member, opposed faces of said channels being spaced apart by at least several times the thickness of the cable, thereby to permit rotation of one member relatively to the other member through an angle of one hundred eighty degrees without knotting of, damage to, or interference from a cable contained between said members and within said swivel joint, the depth $d$ of the circular collar exceeding, by a substantial margin, the radial difference between the circular collar of the lower member and the circular channel of the upper member, said circular collar thus serving simultaneously as a dowel for maintaining alignment between said members and as a dam that is proportioned and positioned to deflect rain water that may find its way between said equatorial faces and so to prevent its leakage into the auxiliary channel of the lower member and thence, through the lower aperture and the lower stub, into the interior of the vehicle.

3. In combination with a vehicle warning lamp, a leakproof swivel device for supporting a mast, carrying said lamp, in upright position above a randomly oriented surface of a vehicle which comprises upper and lower members of outwardly hemispherical shapes and of like radii, a circular collar of depth $d$ protruding from the equatorial face of the lower member, the equatorial face of the upper member being provided with a circular channel of depth in excess of $d$ positioned to mate with said collar, a weather-sealed bolt extending along the axes of both members and through central portions of their equatorial faces, for preventing separation of one member from the other member and permitting friction-loaded relative angular movement of said members about their axes, a first hollow stub extending in a downward direction from the lower member in a direction at substantially forty-five degrees from its axis, said stub terminating in a threaded portion of diameter proportioned to pass through a hole cut through the body of said vehicle, said stub carrying a flange of diameter greater than the diameter of said hole, a collar, concentric with said stub, depending from the lower face of said flange, for centering a gasket of circular section, said threaded portion and said flange together constituting means for fixing said lower member to a randomly oriented part of the vehicle body in an adjustable orientation, a second hollow stub extending in an upward direction from the second member in a direction at substantially forty-five degrees from its axis, the inside diameter of said second stub being proportioned to grasp a lamp-carrying mast by its lower end, the equatorial face of each of said hemispherical members being provided with an auxiliary circular channel, unconnected with said first named channel, the interior of the hollow stub of each member communicating by way of an aperture, through which an electric cable can be threaded, with the bottom of the auxiliary channel of the same member, and radial ribs extending from wall to wall of each auxiliary channel for providing support for the central portions of said members, the depth dimensions of the ribs being less than the depth dimensions of the auxiliary channels by more than the thickness of the cable, thereby to permit rotation of one member relatively to the other member through an angle of one hundred eighty degrees without knotting of, damage to, or interference from a cable lying between the ribs of one member and the ribs of the other member, the depth $d$ of the circular collar exceeding, by a substantial margin, the radial difference between the circular collar of the lower member and the circular channel of the upper member, said circular collar thus serving simultaneously as a dowel for maintaining alignment between said members and as a dam that is proportioned and positioned to deflect rain water that may find its way between said equatorial faces and so to prevent its leakage into the auxiliary channel of the lower member and thence through the lower aperture and the lower stub, into the interior of the vehicle.

References Cited
UNITED STATES PATENTS

| | | | |
|---|---|---|---|
| 695,022 | 3/1902 | Albertson | 285—331 |
| 1,123,839 | 1/1915 | Bridges | 285—331 |
| 1,724,815 | 8/1929 | Adams. | |
| 2,252,395 | 8/1941 | Cohen | 240—8.1 |
| 3,287,549 | 11/1966 | Lantery | 240—8.1 |

NORTON ANSHER, *Primary Examiner.*

RICHARD M. SHEER, *Assistant Examiner.*